C. W. MODLIN & H. J. LUTZ.
POT FOR WINDOW GLASS MACHINES.
APPLICATION FILED APR. 5, 1916.

1,215,571. Patented Feb. 13, 1917.

Witnesses
Paul M. Hunt

Inventors
Chas. Modlin
H. J. Lutz.
By John Louis Waters & Co.
Attorney

UNITED STATES PATENT OFFICE.

CHARLES W. MODLIN AND HARRY J. LUTZ, OF MONONGAHELA, PENNSYLVANIA.

POT FOR WINDOW-GLASS MACHINES.

1,215,571.  Specification of Letters Patent.  Patented Feb. 13, 1917.

Application filed April 5, 1916. Serial No. 89,117.

*To all whom it may concern:*

Be it known that we, CHARLES W. MODLIN and HARRY J. LUTZ, citizens of the United States, residing at Monongahela, in the county of Washington and State of Pennsylvania, have invented certain useful Improvements in Pots for Window-Glass Machines, of which the following is a specification, reference being had therein to the accompanying drawing.

This invention relates to improvements in pots for window glass machines, one object of the invention being the provision of a reversible raised bottom pot having novel means for conducting the air.

A further object of this invention is the provision of a device of this character which is simple, durable and inexpensive in construction and which is therefore thoroughly efficient and practical in use.

In the accompanying drawings:—

Figure 1:
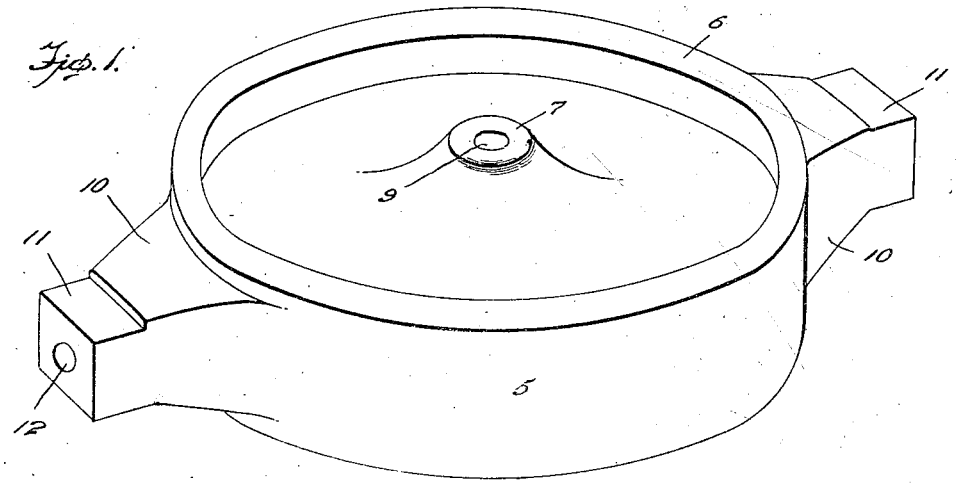
Figure 1 is a perspective view of a complete pot.
Figure 2:
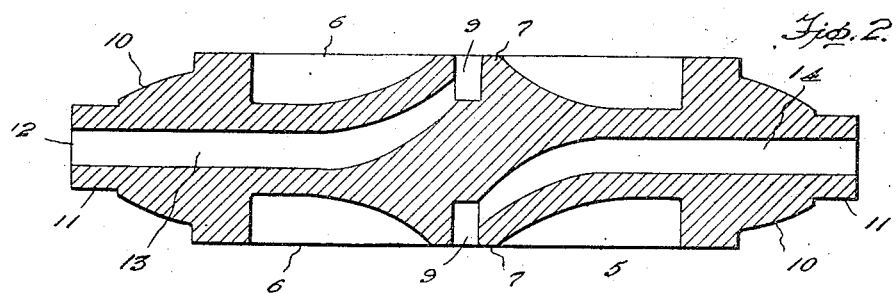
Fig. 2 is a sectional view taken centrally thereof through the opposite wings thereof.
Figure 3:
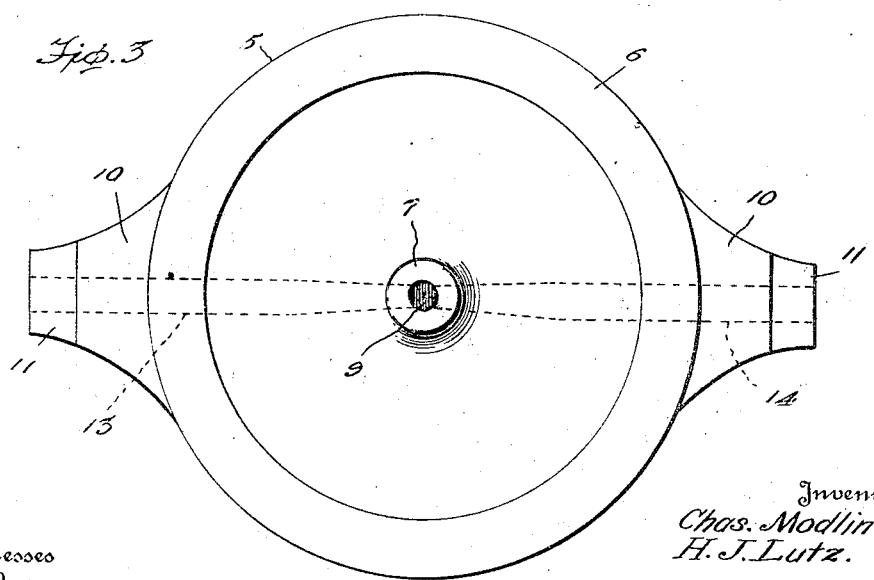
Fig. 3 is a plan view of the pot, dotted lines illustrating the position of the various air channels therein.

Referring to the drawings, the numeral 5 designates the pot proper which is provided upon each face thereof with the rim 6 and the concentrically disposed raised portion 7 having the air port 9 therein.

Formed integral with the pot and projecting from diametrically opposite points thereof, are the projections 10 which are each provided with the reduced end portion 11 for the connection thereto of the air conducting pipes, not shown.

One projection is provided with the port 12 which has a channel 13 leading therefrom through the body of the pot to one of the first mentioned ports 9, while the opposite one is provided with the channel 14 which forms a connection between it and the remaining concentric port 9, so that both of the concentric ports have individual inlet ports for the air and thus provide a double capacity for the pot.

What we claim as new is:—

A pot for window glass machines, having two oppositely disposed circular recessed portions, each of which is provided with a concentric port, two oppositely and diametrically disposed ported projections exteriorly of the pot, the body of said pot being provided with two channels, one connecting each of the concentric ports with its respective ported projection.

In testimony whereof we affix our signatures.

CHARLES W. MODLIN.
HARRY J. LUTZ.